US008681784B2

(12) United States Patent
Garakani et al.

(10) Patent No.: US 8,681,784 B2
(45) Date of Patent: *Mar. 25, 2014

(54) SUPPRESSING HIGH SPEED MODULATION NEGOTIATION

(75) Inventors: Mehryar Khalili Garakani, Westlake Village, CA (US); Herbert M. Wildfeuer, Santa Barbara, CA (US); Gavin Jin, Santa Barbara, CA (US); Chieh-Wen Tsai, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 2059 days.

This patent is subject to a terminal disclaimer.

(21) Appl. No.: 11/562,363

(22) Filed: Nov. 21, 2006

(65) Prior Publication Data
US 2007/0121857 A1 May 31, 2007

Related U.S. Application Data

(63) Continuation of application No. 10/112,367, filed on Mar. 29, 2002, now Pat. No. 7,158,543.

(51) Int. Cl.
*H04L 12/66* (2006.01)
*H04N 7/14* (2006.01)
*H04L 29/06* (2006.01)

(52) U.S. Cl.
CPC ........ *H04L 29/06231* (2013.01); *H04L 65/102* (2013.01); *H04L 29/06482* (2013.01); *H04L 65/601* (2013.01)
USPC ............................................ 370/356; 455/21

(58) Field of Classification Search
None
See application file for complete search history.

(56) References Cited

U.S. PATENT DOCUMENTS 5,227,741 A   7/1993   Marchetto et al.
6,128,370 A  10/2000   Barazesh et al.
(Continued)

OTHER PUBLICATIONS

Author Unknown, ITU-T Standard V.8 bis, Nov. 2000, pp. 1-54.*

(Continued)

*Primary Examiner* — John Blanton
*Assistant Examiner* — Christopher Crutchfield
(74) *Attorney, Agent, or Firm* — Lempia Summerfield Katz LLC

(57) ABSTRACT

In one embodiment, one or more gateways sniff the voice channel during the voice mode. If it is determined that V.8bis signals are being initiated, then the gateway breaks these exchanges by suppressing such signaling. Modem relay communications then are allowed to proceed. Briefly, the method and apparatus involve monitoring a call during a voice mode phase for an initiating signal representative of the defined signaling, the monitoring being performed by a local gateway and, if such an initiating signal is detected during the monitoring, then suppressing such detected signaling in such manner that the signaling does not reach the remote gateway. Preferably, the monitoring is for an initiating signal characterized by a dual tone of defined frequency and duration of approximately 1375 Hz and 2002 Hz for a duration of approximately 400 ms or 285 ms, in agreement with the ITU-T Recommendation V.8bis (standard) adopted by the International Telecommunication Union. Monitoring is continued at least until an answer back from an answering station is received by the gateway. When the suppression succeeds and the remote (non-initiating gateway that may be awaiting such an initiating signal halts any further V.8bis transaction attempts, the local gateway initiates a modem relay session of operation with the remote gateway.

20 Claims, 2 Drawing Sheets

(56) References Cited

U.S. PATENT DOCUMENTS

| | | | |
|---|---|---|---|
| 6,400,709 B1 | 6/2002 | Yousseff | |
| 6,757,250 B1* | 6/2004 | Fayad et al. | 370/235.1 |
| 6,757,367 B1 | 6/2004 | Nicol | |
| 6,785,371 B1 | 8/2004 | Olafsson | |
| 6,788,651 B1* | 9/2004 | Brent et al. | 370/255 |
| 6,799,210 B1 | 9/2004 | Gentry et al. | |
| 6,965,600 B2* | 11/2005 | George | 370/392 |
| 6,985,481 B2 | 1/2006 | Brent et al. | |
| 7,046,072 B2* | 5/2006 | Mack et al. | 327/408 |
| 2002/0064168 A1* | 5/2002 | Garakani et al. | 370/410 |
| 2002/0176401 A1 | 11/2002 | Ryan et al. | |
| 2003/0123466 A1* | 7/2003 | Somekh et al. | 370/401 |

OTHER PUBLICATIONS

Author Unknown, ITU Study Group 16, Question 11: MoIP Involving Partial Modem Termination, Document Id. PCM01-002, Jan. 24, 2001, pp. 1-15.*

Author Unknown, ITU Study Group 16, Question 11: Comparison of Various MoIP Proposals, Document Id. PCM01-005, Jan. 24, 2001, pp. 1-8.*

Author Unknown, ITU Study Group 16, Question 11: Modem Transport Over IP Using SPRT, Document Id. PCM01-006, Jan. 24, 2001, pp. 1-17.*

Author Unknown, ITU Study Group 16, Comparison between MoIP error correction and data compression techniques, Document Id. PCM01-008, Jan. 24, 2001, pp. 1-7.*

K. Chu, Consideration of V.8 bis in MoIP, TR-30 Meetings, Document No. TR-30.1/01-12-066, Dec. 7, 2001, pp. 1-3.*

Author Unknown, ITU-T Standard V.8, Nov. 2000, pp. 1-19.*

Nicholas, et al. (M. Nicholas, Automatic Detection of Analog Modems and Facsimile Machines, 3Com Submission to ITU Study Group 16, Question 11, Apr. 4, 2001, pp. 1-6).*

Telecommunications Standardization Sector of ITU, "ITU-T V:8 bis Series V: Data Communication Over the Telephone Network", Sep. 1998.

* cited by examiner

SUPPRESSING HIGH SPEED MODULATION NEGOTIATION

CROSS REFERENCE TO RELATED APPLICATIONS

This application is a continuation of U.S. patent application Ser. No. 10/112,367 filed on Mar. 29, 2002, now pending, the disclosure of which is herein incorporated by reference.

BACKGROUND OF THE INVENTION

The present invention relates generally to voice frame network systems such as Voice over Internet Protocol (VoIP) systems for concurrently carrying both voice and data signals, and more particularly it concerns method and apparatus for suppressing disruptive V.8bis negotiations during the startup phase of modem relay communication between two gateways. V.8bis herein refers generally to the historic and continually evolving ITU-T Recommendation V.8bis (standard) adopted by the International Telecommunication Union, familiarity with which is assumed.

Immediately below are a few definitions related to V.8bis:

V.8bis Signal: V.8bis information sent via tones.

Initiating Signal: A V.8bis signal, which initiates a V.8bis transaction.

Responding Signal: A V.8bis signal that is sent in response to an initiating signal.

V.8bis Message: V.8bis framed information sent at 300 bits/sec using V.21 channels.

V.8bis Transaction: A sequence of V.8bis signals and messages, beginning an initiating signal and terminating with either a positive acknowledgement, a negative acknowledgement or a timeout.

Answering Station: Client device that answers a PSTN call.

Calling Station: Client device which originates a PSTN call.

Initiating Station: Client device which initiates a V.8bis transaction, may be either the Answering or Calling Station.

Responding Station: Client device that responds to the initiator of a V.8bis transaction.

V.8bis-capable modems can exchange V.8bis transactions during call establishment phase or subsequently at later points during the "voice mode" (before transitioning the channel into "modem relay" mode).

The V.8bis capability is optional and only some modems presently support it. V.8bis transactions use signals or messages that are transmitted with adequate fidelity across a wide range of voice codes.

If both client devices are V.8bis capable, the V.8bis transactions would proceed during the voice mode (prior to Answer tone). These transactions result in complications and potential disruption. For example, the transactions might:

a) Modify subsequent V8 procedures. For example, shorten the V8 startup by eliminating V8 CM. Eliminating CM is detrimental, since it is a trigger into modem relay mode, and having it eliminated can fail successful transactions into modem relay mode.

Additionally:

b) Some high speed proprietary modulations (prior to V.90) use V.8bis negotiations. This means V.8bis negotiations might result in client devices configuring themselves for a proprietary high-speed modulation, which may not be supported on most modem relay gateways. In the latter case, there would be call failure.

As noted above, the V.8bis procedures are optional and occur only when both client devices are capable. Hence, these procedures are not required to achieve successful modem calls (since there is no guarantee both devices are capable). However, they can have a number of detrimental effects on mode relay operation, significantly complicating modem relay gateway implementation.

SUMMARY

In one embodiment, one or more gateways sniff the voice channel during the voice mode. If it is determined that V.8bis signals are being initiated, then the gateway breaks these exchanges by suppressing such signaling, thereby avoiding the above-described detrimental effects. Modem relay communications then are allowed to proceed. Briefly, the method and apparatus involve monitoring a call during a voice mode phase for an initiating signal representative of the defined signaling, the monitoring being performed by a gateway and, if such an initiating signal is detected during the monitoring, then suppressing such detected signaling in such manner that the signaling does not reach the remote gateway. Preferably, the monitoring is for an initiating signal characterized by a dual tone of defined frequency and duration of approximately 1375 Hz and 2002 Hz for a duration of approximately 400 ms or 285 ms, in agreement with the ITU-T Recommendation V.8bis (standard) adopted by the International Telecommunication Union. Monitoring is continued at least until an answer back from an answering station is received by the gateway. When the suppression succeeds, this halts any further V.8bis transaction attempts, the local gateway initiates a modem relay session of operation with the remote gateway.

DETAILED DESCRIPTION OF THE EMBODIMENTS

There are a number of variations of V.8bis transaction scenarios that are possible, including exchanges prior to answer tone or at any other time during the voice mode.

However, there is a commonality to all V.8bis transactions that can be utilized very effectively by the modem relay gateways. All transactions start with an exchange of so-called "initiating signals." Furthermore, all initiating signals may be characterized as including a period of dual tone at 1375 Hz and 2002 Hz followed by a period of single frequency tone that is specific to each signal. The duration of the dual tone is normally 400 ms (but may be shortened to 285 ms for some signals—see Section 7.1.2 of the V.8bis standard). The duration of the single frequency tone is 100 ms.

The above considerations suggest a simple and effective way for modem relay gateways to break V.8bis exchanges. The following technique has proven effective:

a) If the channel is enabled for modem relay, the gateways look for frequencies associated with initiating tones at all times when the channel is in voice mode (including prior to any answer back tone from the Answering Station).

b) If the gateways detect dual tones (1375 Hz and 2002 Hz) incoming on the telephony leg, they block transmitting the dual tone into the IP network. This means the dual tone would not be injected into the IP network. It also avoids having to further monitor the channel for single tones of diverse frequencies.

b) Because the dual tone from the Initiating Station would not reach the client device on the other side of the network, no V.8bis transactions can occur. The Initiating Station would interpret this as lack of V.8bis capability from the other client device and would terminate V.8bis and proceed with the rest of the modem relay handshake, as desired.

Figure 1:
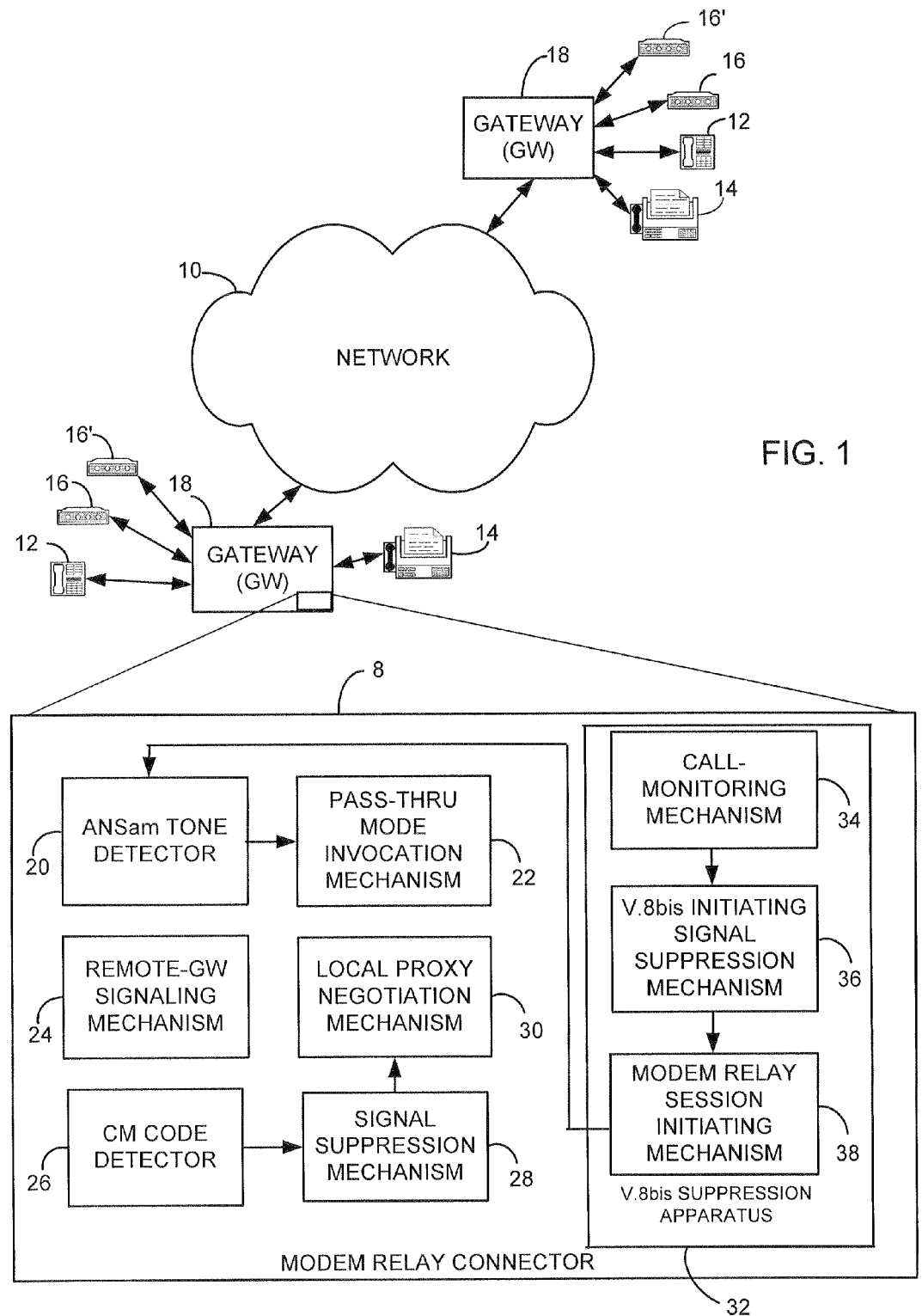
FIG. 1 is a system block diagram illustrating a VoIP network in which a modem relay connector and the invented suppression apparatus are featured in accordance with a preferred embodiment of the invention.

FIG. 1 illustrates the invented apparatus at 8 coupled with a network 10 operating with respect to voice traffic thereon in accordance with a voice packet protocol such as a voice over frame relay (VoFR) protocol or voice over Internet protocol (VoIP). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 may share telephone numbers with the telephone handsets to provide facsimile, e-mail and Internet service to users/clients. High-speed modems 16' having data rates of 32 kbits/second (kbps) or higher are typically provided.

Handsets 12 communicating voice typically require bit rates of approximately 8 k-64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using RTP or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been passive enablers of the resulting voice mode VoIP connection which may be subject to high packet drop rates resulting in frequent retrains.

One solution to the problem described above is described in co-pending U.S. application Ser. No. 09/728,430 filed Nov. 30, 2000 and subject to common ownership herewith by Cisco Technology, Inc. The solution proposed therein is to terminate the physical layer, e.g. V.34, at the VoIP gateway, and to packetized and transmit the demodulated data bit stream over the IP network to the peer gateway where it is reconstructed and forwarded to the receiving modem. This is referred to as a modem relay mode of operation. By monitoring physical layer negotiation between endpoints, it is determined whether the endpoints are modems negotiating a high-speed dial-up connection. If so, the VoIP gateways take over the end-to-end negotiation of the physical layer, terminating the physical layer locally on their adjacent telephony segment.

Modem relay startup must first determine that the originating and answering modems are high-speed modems through appropriate tone detection sensitive enough to distinguish low-speed modems 16 and fax 14 signals from high-speed modem 16' dial-up connections. It must then smoothly transition to modem relay mode at an appropriate time and in a non-disruptive manner during the sensitive end-to-end physical layer negotiation. Such may be accomplished in accordance with the teachings of the above-cited co-pending patent application or by any other suitable means, within the spirit and scope of the present invention.

The problem solved by the present invention is that, prior to such a modem relay connection being made, V.8bis traffic between the local and remote gateway or stations connected thereto can be disruptive. Thus, the invention proposes method and apparatus for suppressing such V.8bis traffic, thereby permitting the modem relay connection to be initiated at once even if the modems 16' involved in the modem relay connection utilize V.8bis signaling.

Referring again now to FIG. 1, apparatus 8 will be described in more detail. Apparatus 8, which may be thought of as including a modem relay connection mechanism or modem relay connector, includes an ANSam tone detector 20; a pass-through (pass-thru) mode invocation mechanism 22; and preferably also a remote-gateway (remote-GW) signaling mechanism 24. Apparatus 8 also includes a CM code detector 26; a signal suppression mechanism 28; and a local proxy negotiation mechanism 30. As will be understood from the above description, ANSam detector 20 may cause pass-through mode invocation mechanism 22 to disable voice compression, and possibly also echo cancellation, if either or both are determined to have been enabled. ANSam detector 20 also causes remote-GW signaling mechanism 24 to signal the remote gateway 18 connected to the far-end modem. Those of skill in the art will appreciate that it is not yet determined to a high degree of certainty that both modems are high-speed.

Upon detection of a CM code by code detector 26, the transition to modem relay mode may begin, since detection of a CM code by either gateway 18 indicates that a high-speed modem 16' has received an ANSam from another high-speed modem 16' in accordance with the V.34 protocol. Thus, CM code detector 26 causes a signal suppression mechanism 28 immediately to suppress further signals between high-speed modems 16', effectively terminating the end-to-end physical layer negotiations therebetween. Once signals have been suppressed—at what is referred to herein as a predeterminedly early time in the end-to-end negotiations—local proxy negotiation mechanism 30 transmits or detects consecutive CM codes, as described above, and then completes local physical layer negotiation in accordance with the high-speed, dial-up V.34 modem protocol.

Those of skill in the art will appreciate that, within the spirit and scope of the present invention, modem relay connector 8 may take alternative forms. The subject of the present invention is avoidance of disruptive V.8bis transactions between gateways that might make such a modem relay connection difficult or impossible to achieve. Thus, prior to detection of an answer tone, V.8bis traffic between gateways is suppressed during the voice phase of operation until answer tone detection represented as the first block of modem relay connector 8.

It is the invented method and apparatus by which potentially disruptive V.8bis transactions are suppressed that is the subject of the detailed description and claims that follow.

Referring still to FIG. 1, the illustrated apparatus may be seen further to include a V.8bis suppression apparatus 32, in accordance with the present invention. V.8bis suppression apparatus 32 includes a call-monitoring mechanism 34 for monitoring a call during a voice mode phase for an initiating signal representative of a V.8bis transaction. Such an initiating signal under V.8bis is typically characterized by a dual tone of predefined frequency and duration. V.8bis suppression apparatus 32 also includes a V.8bis initiating signal suppression mechanism 36 at the local gateway for suppressing such detected signaling such that the signaling does not reach the remote gateway. Finally, V.8bis suppression apparatus 32 includes a modem relay session initiating mechanism 38 at the local gateway for initiating a modem relay session with the remote gateway, which modem relay session initiating mechanism 38 may simply invoke modem relay connector 8 as illustrated.

Figure 2:
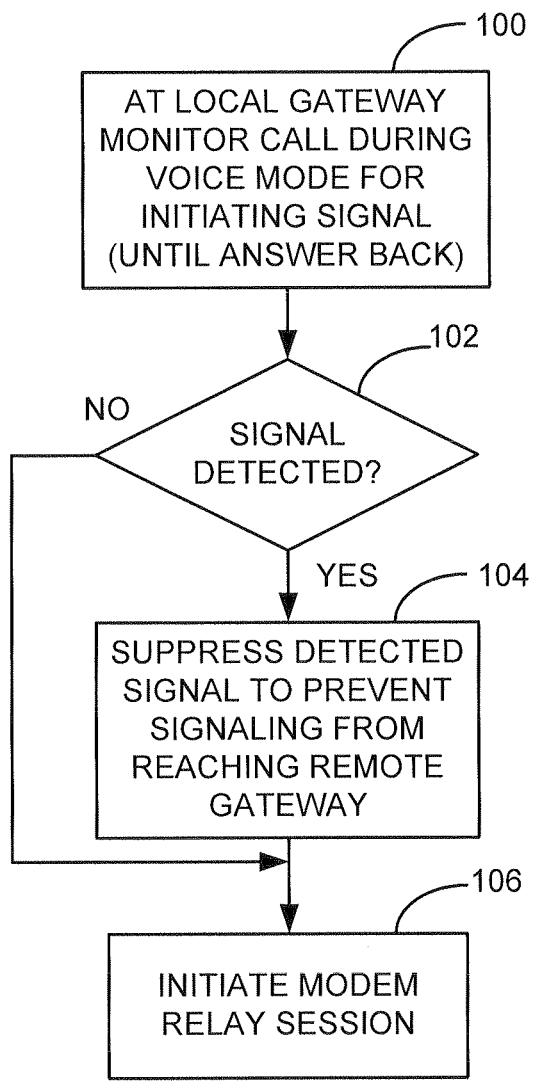
FIG. 2 is a flowchart of the suppression method for modem relay in accordance with a preferred embodiment of the invention.

Preferably, the invention is implemented in software. FIG. 2 illustrates one embodiment of the invented method of selectively suppressing a defined signaling at a modem relay gateway. The method includes a) at 100, monitoring a call during a voice mode phase for an initiating signal representative of the defined signaling, the monitoring being performed by a gateway, and b) at 102 determining whether an initiating signal representative of the defined signaling is detected during the monitoring, and, if so then c) at 104 suppressing such detected signaling in such manner that the signaling does not reach the remote gateway. As noted above, the monitoring is for an initiating signal characterized by a dual tone of defined frequency and duration. In accordance with the current V.8bis standard, the dual tone is at a frequency of approximately 1375 Hz and 2002 Hz and for a duration of approximately 400 ms (or, alternatively 285 ms). Because of the dual tone detection scheme embodied in the invented method and apparatus, detection of a V.8bis single frequency tone that may vary in frequency and duration is unnecessary.

It may be seen from FIG. 2 that the monitoring is continued at least until an answer back from an answering station is received by the gateway. It also will be appreciated that, after the suppression succeeds, this halts any further V.8bis transaction attempts, at 106, d) the local gateway initiates a modem relay session of operation with the remote gateway.

The invention is elegant in its simplicity. It greatly simplifies modem relay gateway design by avoiding support for proprietary speed modem modulations. Use of the invention also avoids the problems associated with shortening V8 negotiation, e.g., by eliminating CM.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. An apparatus, comprising:
    means for monitoring a received call for signals communicated by a first modem;
    means for observing a predetermined dual tone included in the signals, the predetermined dual tone identifying the signals as configured to negotiate a predetermined high speed modulation;
    means for initiating a modem relay session on an internet protocol network between a local gateway coupled to the first modem and a remote gateway coupled to a second modem; and
    a suppression apparatus of the local gateway configured to suppress the observed predetermined dual tone from the remote gateway such that the dual tone from the remote gateway is not transmitted to the internet protocol network in order to prevent the second modem from responding to the identified signals in response to observing the predetermined dual tone.

2. The apparatus of claim 1 wherein the predetermined dual tone includes frequencies of approximately 1375 Hz and 2002 Hz.

3. The apparatus of claim 1 wherein the predetermined dual tone occurs before an answer tone is received for the monitored call.

4. The apparatus of claim 1 wherein the modem relay session operates independently of the predetermined high speed modulation.

5. The apparatus of claim 4 wherein the first and second modems are compatible with the predetermined high speed modulation.

6. The apparatus of claim 1 wherein observed predetermined dual tone is suppressed by the first local gateway that is located between a packet switched network and a circuit switched network.

7. An apparatus comprising:
    one or more processors; and
    a memory coupled to the processors comprising instructions executable by the processors, the processors operable when executing the instructions to:
    receive a call communicated by a first modem and addressed for transfer to a second modem;
    monitor the call for a dual tone configured to elicit a predetermined high speed modulation compatibility response from the second modem;
    suppress the dual tone at a local gateway such that the dual tone does not reach a remote gateway corresponding to the second modem, thereby preventing the dual tone from eliciting the predetermined high speed modulation compatibility response from the second modem and terminating end-to-end physical layer negotiations between first modem and the second modem; and
    initiate a modem relay session with the remote gateway.

8. The apparatus of claim 7 wherein the dual tone includes frequencies of approximately 1375 Hz and 2002 Hz.

9. The apparatus of claim 7 wherein the modem relay session is established without using a predefined high speed modulation that corresponds to the dual tone.

10. The apparatus of claim 7, wherein the dual tone is identified by observing frequency and duration.

11. The apparatus of claim 7 wherein the monitoring occurs at least until an answer back originating from an answering station is received.

12. The apparatus of claim 7 wherein the first modem determines that the second modem is incompatible with a predefined high speed modulation based on suppression of the dual tone.

13. The apparatus of claim 7 wherein the dual tone is included in initiating signals that are configured to determine compatibility with a predefined high speed modulation.

14. A method comprising:
- monitoring a call for signals communicated by a first modem and addressed for transfer to a second modem;
- detecting whether the signals include a call menu code;
- detecting whether the signals include one or more initiating tones that identify the signals as negotiating a predetermined high speed modulation;
- blocking, in response to the call menu code, the initiating tones from reaching a remote gateway to prevent the second modem from responding thereby preventing the modems from completing negotiation of the predetermined high speed modulation for the monitored call; and
- initiating a modem relay session with the remote gateway.

15. The method of claim 14 wherein the initiating tones include frequencies of approximately 1375 Hz and 2002 Hz.

16. The method of claim 14 wherein blocking the initiating tones occurs at an on-path network device that is remote with respect to the first modem.

17. The method of claim 16 wherein the on-path network device is a local gateway located between a circuit switched network and a packet switched network.

18. The method of claim 14, wherein said monitoring is continuous for the duration of a voice mode phase and at least until an answer back from an answering station is locally received.

19. The method of claim 14 further comprising exchanging consecutive Call Menu (CM) signals that trigger initiation of modem relay mode.

20. The method of claim 14 wherein said blocking of the initiating tones terminates end-to-end physical layer negotiations.

* * * * *